(12) United States Patent
Mietke

(10) Patent No.: US 12,314,160 B2
(45) Date of Patent: May 27, 2025

(54) DYNAMIC CONTENT ADJUSTMENT FOR ELECTRONIC DOCUMENT

(71) Applicant: SAP SE, Walldorf (DE)

(72) Inventor: Sebastian Mietke, Wiesloch (DE)

(73) Assignee: SAP SE, Walldorf (DE)

( * ) Notice: Subject to any disclaimer, the term of this patent is extended or adjusted under 35 U.S.C. 154(b) by 131 days.

(21) Appl. No.: 17/377,569

(22) Filed: Jul. 16, 2021

(65) Prior Publication Data
US 2023/0017071 A1    Jan. 19, 2023

(51) Int. Cl.
  *G06F 11/3668*  (2025.01)
  *G06F 8/73*  (2018.01)
  *G06F 11/3698*  (2025.01)

(52) U.S. Cl.
  CPC ............ *G06F 11/3696* (2013.01); *G06F 8/73* (2013.01); *G06F 11/3698* (2025.01)

(58) Field of Classification Search
  CPC .. G06F 11/36–3696; G06F 9/543; G06F 8/73; G06F 11/3698
  See application file for complete search history.

(56) References Cited

U.S. PATENT DOCUMENTS

| | | | | |
|---|---|---|---|---|
| 6,964,015 B2* | 11/2005 | Demopoulos | ......... | G06F 40/169 715/233 |
| 7,269,664 B2* | 9/2007 | Hutsch | .................... | H04L 61/45 707/999.1 |
| 7,613,600 B2* | 11/2009 | Krane | ..................... | G06F 9/451 704/1 |
| 7,849,447 B1* | 12/2010 | Karis | .................. | G06F 11/3672 717/125 |
| 8,953,908 B2* | 2/2015 | Rodriguez | ......... | H04N 1/32149 382/305 |
| 9,092,121 B2* | 7/2015 | Albouyeh | ............... | G06F 9/543 |
| 10,474,481 B2* | 11/2019 | Snir | ....................... | G06F 40/106 |
| 10,599,283 B2* | 3/2020 | Ligameri | ............ | G06F 3/04812 |

(Continued)

OTHER PUBLICATIONS

Anonymous, "Introduction to Cascading Style Sheets", Vaadin [online], Feb. 2021 [retrieved Nov. 30, 2023], Retrieved from Internet: <URL: https://vaadin.com/docs/v8/framework/themes/themes-css>, whole document.*

*Primary Examiner* — Todd Aguilera
(74) *Attorney, Agent, or Firm* — Buckley, Maschoff & Talwalkar LLC

(57) ABSTRACT

Provided is a system and method for dynamically adjusting a descriptive document with instructions for a user interface based on configuration settings and software version and/or release for a particular user and document data stored in a technical data object. The process ensures that the content of the descriptive document matches what a user will see on a screen when viewing the user interface. In one example, the method may include retrieving user interface configuration settings generating a simulated user interface that includes a plurality of user interface elements and formatting the user interface elements based on the user interface configuration settings, composing a window with text from a document and screenshot images of one or more formatted user interface elements from the simulated user interface corresponding to the text, and rendering the window via a display of a computing device.

18 Claims, 7 Drawing Sheets

(56) References Cited

U.S. PATENT DOCUMENTS

| | | | | |
|---|---|---|---|---|
| 11,960,447 B2* | 4/2024 | Zadina | .................. | G06F 16/168 |
| 2001/0034771 A1* | 10/2001 | Hutsch | .................... | H04L 61/35 |
| | | | | 709/217 |
| 2004/0143792 A1* | 7/2004 | Demopoulos | ......... | G06F 40/143 |
| | | | | 715/234 |
| 2005/0149206 A1* | 7/2005 | Krane | .................... | G06F 9/451 |
| | | | | 700/17 |
| 2006/0115108 A1* | 6/2006 | Rodriguez | ......... | H04N 1/32352 |
| | | | | 707/E17.031 |
| 2008/0282160 A1* | 11/2008 | Tonnison | ................ | G06F 9/451 |
| | | | | 715/785 |
| 2009/0064038 A1* | 3/2009 | Fleischman | ........... | G06F 3/0482 |
| | | | | 715/810 |
| 2014/0157168 A1* | 6/2014 | Albouyeh | ............... | G06F 9/451 |
| | | | | 715/770 |
| 2017/0192797 A1* | 7/2017 | Snir | ...................... | G06F 40/106 |
| 2019/0163343 A1* | 5/2019 | Ligameri | .............. | G06F 1/1641 |
| 2022/0067072 A1* | 3/2022 | Emigh | .................. | G06F 16/986 |
| 2022/0206995 A1* | 6/2022 | Zadina | ................... | G06F 9/543 |

\* cited by examiner

Test Case Goals — 110

Step 1: Create a New Asset

Step 2: Create an Invoice Posting

Step 3: Start a Settlement Process

Step 4: Adjust a Settlement Rule

---

Screen Shots / Description — 120

Step 1a: Select Type of Asset to Create — 122

For a New Asset, Select "New Asset"

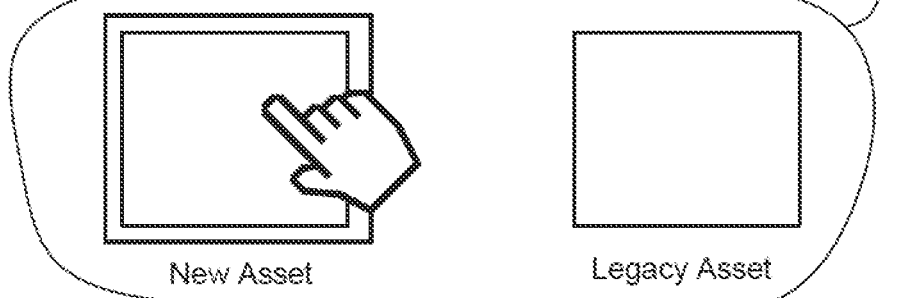

124

New Asset      Legacy Asset

Step 1b: Enter a Name for the Asset — 126

Right Click on the Newly Created Asset File and Select "Edit Name".

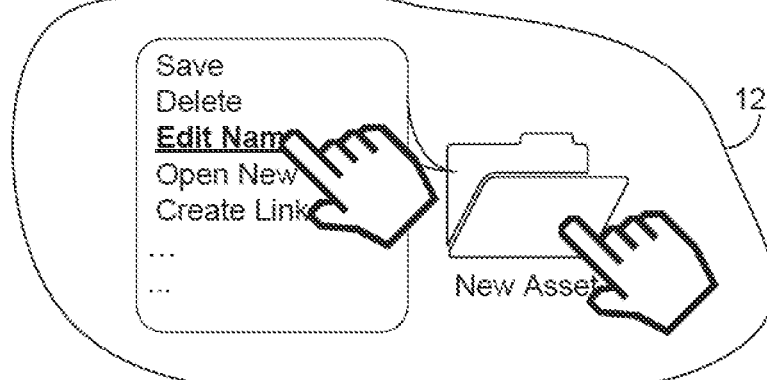

128

Save
Delete
Edit Name
Open New
Create Link
...
...

New Asset

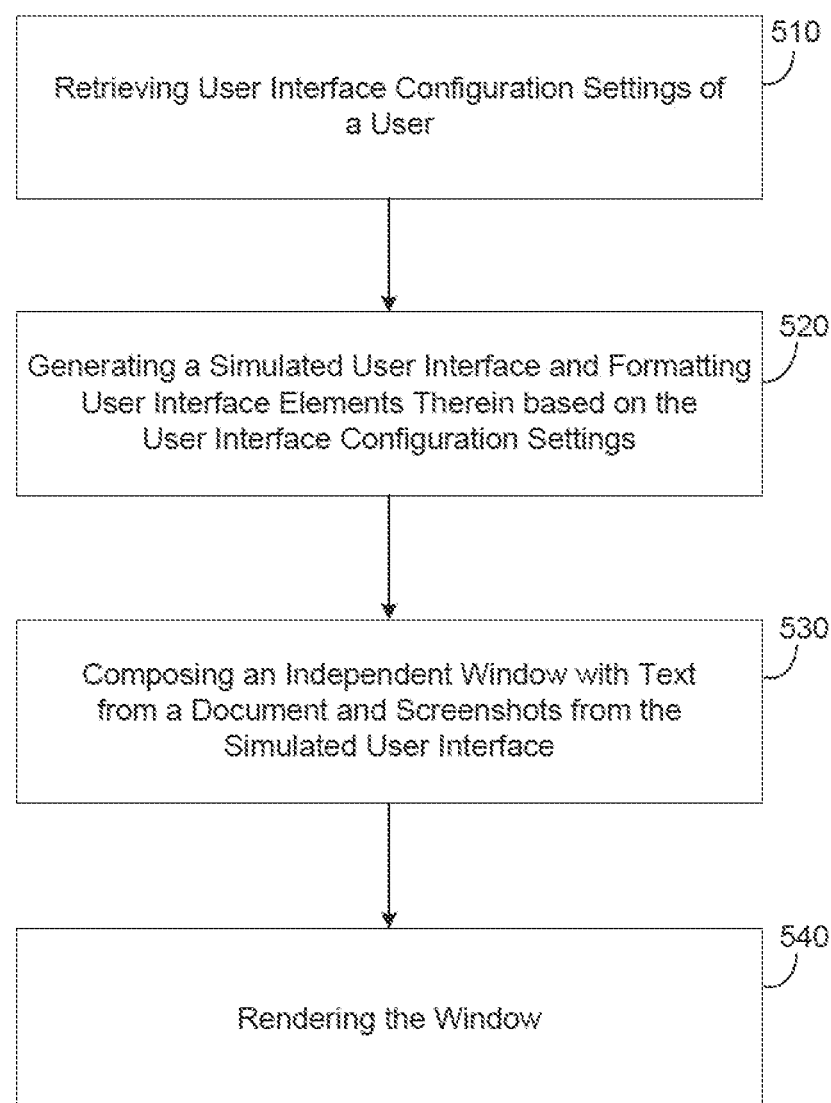

DYNAMIC CONTENT ADJUSTMENT FOR ELECTRONIC DOCUMENT

BACKGROUND

Testing is an essential step in the software development life cycle. Aspects like functional correctness or compliance with product standards, such as accessibility, security, performance have to be tested. These tests are performed for both new features and also to test "old" functionality such as through regression tests. Many tests are performed by a user manually inputting commands into a user interface of a test environment. Therefore, user interface testing is still (and will continue to be) very important. For example, external testers and also customers (e.g., during a solution acceptance test (SAT)) may perform tests via the user interface. Each of these tests may be executed according to a test case description. Such a test case description might be a document that is physically handed to the user when they enter the premise for testing as well as digital copies of the document. The document may contain descriptive texts and/or screenshots of the corresponding process steps to be performed via the user interface. It also contains information about the checks, to be performed by the tester.

Unfortunately, in many cases, what is printed in the test case description does not match what the user is seeing on their screen. Many of these unnecessary incidents are caused by mismatches between the UI described in the test case and the actual UI being viewed by the user. For example, developers may continually make changes to the user interface without updating the corresponding handout with the test case description. As another example, a user's particular configuration settings may change the user interface such that features are hidden or are no longer positioned in the same position as in the printed test case description. The result is that a user gets stuck during testing and an issue has to be reported and the user's particular session has to be fixed by an admin, etc. Just reviewing the test case description does not solve this issue, especially for the regression tests.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1 is a diagram illustrating an example of a descriptive document in accordance with an example embodiment.

FIG. 5 is a diagram illustrating a method of rendering a descriptive document in accordance with an example embodiment.

Figure 2:
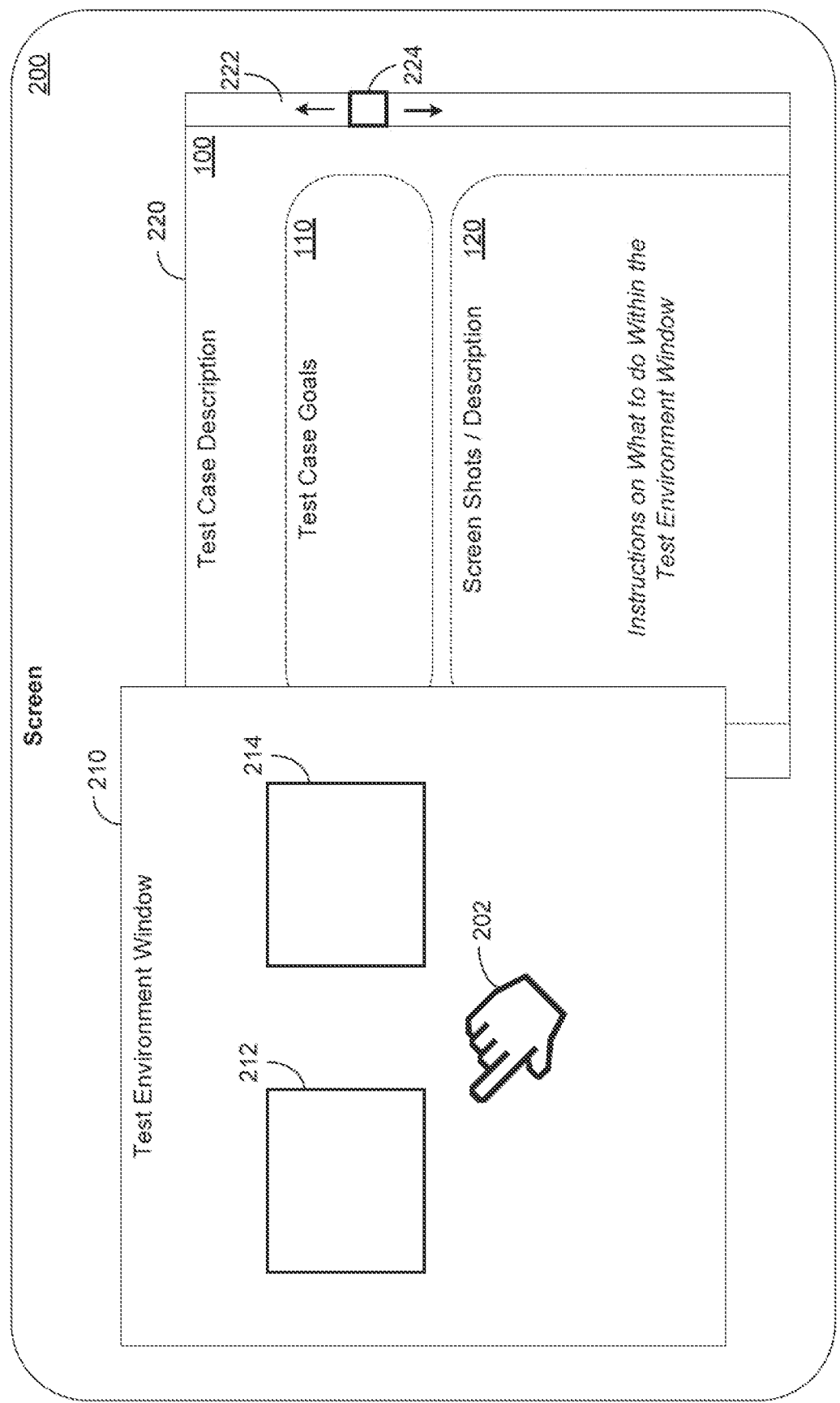
FIG. 2 is a diagram illustrating a user interface that includes a descriptive document next to a test environment in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

A solution acceptance test (SAT) occurs when a client manually tests a new functionality of a software release that has been created by a developer. The client executes the new functionality and the developer provides a handout that contains screen shots and descriptions on how to perform the new functionality via a user interface (UI). In this case, the handout is a descriptive document with instructions on how to interact with the user interface elements (e.g., what commands to input, etc.) in order to test out the functionality. The handout may include both screen shot images of the commands to enter as well as a description corresponding to the screen shot image explaining what is occurring within the screen shot image.

Over time, the location and even the presence of these UI elements may change which results in the instructions being incorrect. Here, the user is unaware of what to do and often gets stuck during the test causing tickets and other issues. In many cases, the root cause of the problem is the test case description. Furthermore, the UI and configuration settings (languages, etc.) may change per user which results in different views of the underlying data but the technical data (underlying data) is stays the same (stable).

According to various embodiments, a digital version of the descriptive document may be created without the need for a paper handout and without a fixed digital copy which does not contain user/version specific adjustments. Moreover, the digital version of the descriptive document may include stable technical data of the descriptive document from an underlying technical data object and screen shot images captured from a simulated UI including the user settings. The descriptive document may refer to various elements that the user is to interact with within the user interface, for example, selecting an option, button, icon, menu, file, tab, etc. That is, the descriptive document may describe commands that are to be entered/input via user interface elements (buttons, menus, bars, tabs, etc.) of a user interface that is shown in parallel (in a separate window) from the window which includes the digital descriptive document.

The example embodiments overcome the drawbacks in the art by dynamically creating a digital descriptive document based on technical data extracted from the document during a document creation process or upload process, and screen shots captured from a simulated user interface with the user-specific settings applied. Rather than use a paper handout, the example embodiments generate a digital/electronic document that can be displayed within a window on the screen, for example, next to a window of the test case environment, etc. This ensures that the views of the user interface that are added to the descriptive document match what the user is seeing when they interact with the test case environment.

Each time a different user access the descriptive document, the system can dynamically adjust the descriptive document that is output to the respective user based on the user's specific settings. The simulated user interface instantiated by the system may include a display of the user interface with the user's specific configuration settings applied thereto. The simulated user interface may be stored within a temporary storage area, such as a clipboard of the user interface framework. Accordingly, screen shots can be captured from the simulated user interface and passed back to a window where the descriptive document is being rendered.

Furthermore, the technical data (stable and unchanging data) of the descriptive document such as the names of the fields, they types, etc., can be extracted from the descriptive document during a document creation process and added to a technical data object which stores only the technical data of the document. The system can blend the technical data from the technical data object with the user interface configuration settings of the user to create a dynamically adjusted descriptive document. In principal, the technical data objects remain the same/stable over time while the UI changes. Furthermore, the technical data object is user independent. Meanwhile, the UI and display settings can vary from user to user.

The example embodiments may be embodied within a software application (e.g., a system, etc.) hosted by a computer such as a web server, a cloud platform, a user computing device, and the like. The system may derive the technical field names and attributes from the document during a document creation process performed by a document author. The technical field names and attributes may be stored within a technical data object that stores static data of the user interface. It is part of the UI framework, and it is used for representing data in the user interface. The idea is not to use the original non-user related screen shots within the original document but to use the technical reference which is then translated using the system parameters and the user parameters of the tester. But the underlying data that goes into the user interface that each of the user's see is from the same technical object.

The technical data that is stored in the technical data object may be configuration data that is used to build the user interface by the UI framework, but they may not be displayed. The technical data may include the field names/identifiers and corresponding values thereof for various user interface configuration elements. Other features such as color, location, language, etc. are user dependent and are not added to the technical data object. That is, the system selective extracts only the static/unchanging user interface data elements that do not change regardless of the user and regardless of the technical configuration. The remaining attributes of the user interface for format/rendering can be translated for a specific user. Thus, the example embodiments extract the pure technical data from the document and simulates a screen shot of the document for the user based on the user's parameters such as language, format, style, design, options, etc. and based on the current technical configuration. The system can then extract screen shots of the document within the user interface with the user-specific settings applied thereto and add the screen shots to the instance of the document being dynamically generated. In this case, the user would receive a window on their screen next to the application window where the application is being tested.

One of the advantages in the example embodiments is that both the test case description within the descriptive document that is rendered in parallel to the test case environment window, and the content within the text case environment window are linked together by the system thereby ensuring that the test case description matches the current UI content. Furthermore, the user settings can simultaneously be applied on an individual/specific basis. The system may also perform a validation of the technical data from the technical data object. Some checks can be introduced such as checking the instance of the document to ensure that the real screen shots have been added instead of technical references, etc. Furthermore, if a document author introduces a real screenshot that is user-dependent the document author may be issued a warning by the system indicating that the document author should introduce a technical reference, not the user-specific data element.

FIG. 1 illustrates an example of a descriptive document 100 in accordance with an example embodiment, and FIG. 2 illustrates a screen 200 (e.g., display screen, user interface, display device, monitor, etc.) that includes the descriptive document 100 in a window 220 next to a window 210 that includes a test environment in accordance with example embodiments. Referring to FIG. 1, the descriptive document 100 may include various sections with instructions and descriptions of inputs that are to be made by a user within a user interface. The descriptive document 100 may include a list of goals 110 which describe a summary of the various functions that the test is going to invoke. The descriptive document 100 may also include a descriptive section 120 with text 122 and 126 and screen shot images 124 and 128. Here, the text 122 describes what is being performed within the screen shot image 124, and the text 126 describes what is being performed in the screen shot image 128. The descriptive document 100 may include other features not shown.

Traditionally, the descriptive document 100 is printed out and handed to a test user during a solutions acceptance test. However, in the example embodiments, a digital instance of the descriptive document 100 may be dynamically generated differently for a plurality of different users. In particular, each user may receive the same technical data (e.g., field names, data types, etc.) within their instance of the digital document that is rendered on their screen. However, the style of the digital document will differ based on user-specific settings for the different users. In doing so, the different instances of the descriptive document 100 that are generated for the different users may have different formats, styles, languages, colors, etc., based on the user settings, but will have the same technical data such as field names, field data types, and the like.

Referring to FIG. 2, in this example, the descriptive document 100 that is generated in the process of FIG. 1, may be rendered within the window 220 of a screen 200 of a user computing device. Here, the window 220 may be displayed in parallel (i.e., adjacent on the screen) and simultaneously with a window 210 that includes a test case environment where a user may input commands and test functionality of a software application/program under test. For example, the window 210 may display a user interface that includes various UI elements such as buttons, menus, commands, sub-menus, pages, tabs, etc., and text associated therewith. Here, the descriptive document 100 may include instructions/screen shots for inputting commands into the user interface of the test case environment shown within window 210. For example, which buttons to press, an order, a menu to select, a command to select from a menu, a drag-and-drop command, a radio button selection, etc., can be included within the descriptive document 100.

The user is free to move a cursor 202 over either of the windows 210 and 220 and select user interface elements 212 and 214 via the window 210 to control functionality of the software tinder test. Meanwhile, the descriptive document 100 within the window 220 includes text and images/screen shots which are not executable, like source code, but rather descriptive content embedded and visible within a document such as a .PDF, a .JPEG, a word document, a spreadsheet, a file, or the like. Here, a user can move a scroll bar 224 along a track 222 to scroll through the content of the descriptive document 100 that is visible on the screen 200.

Figure 3:
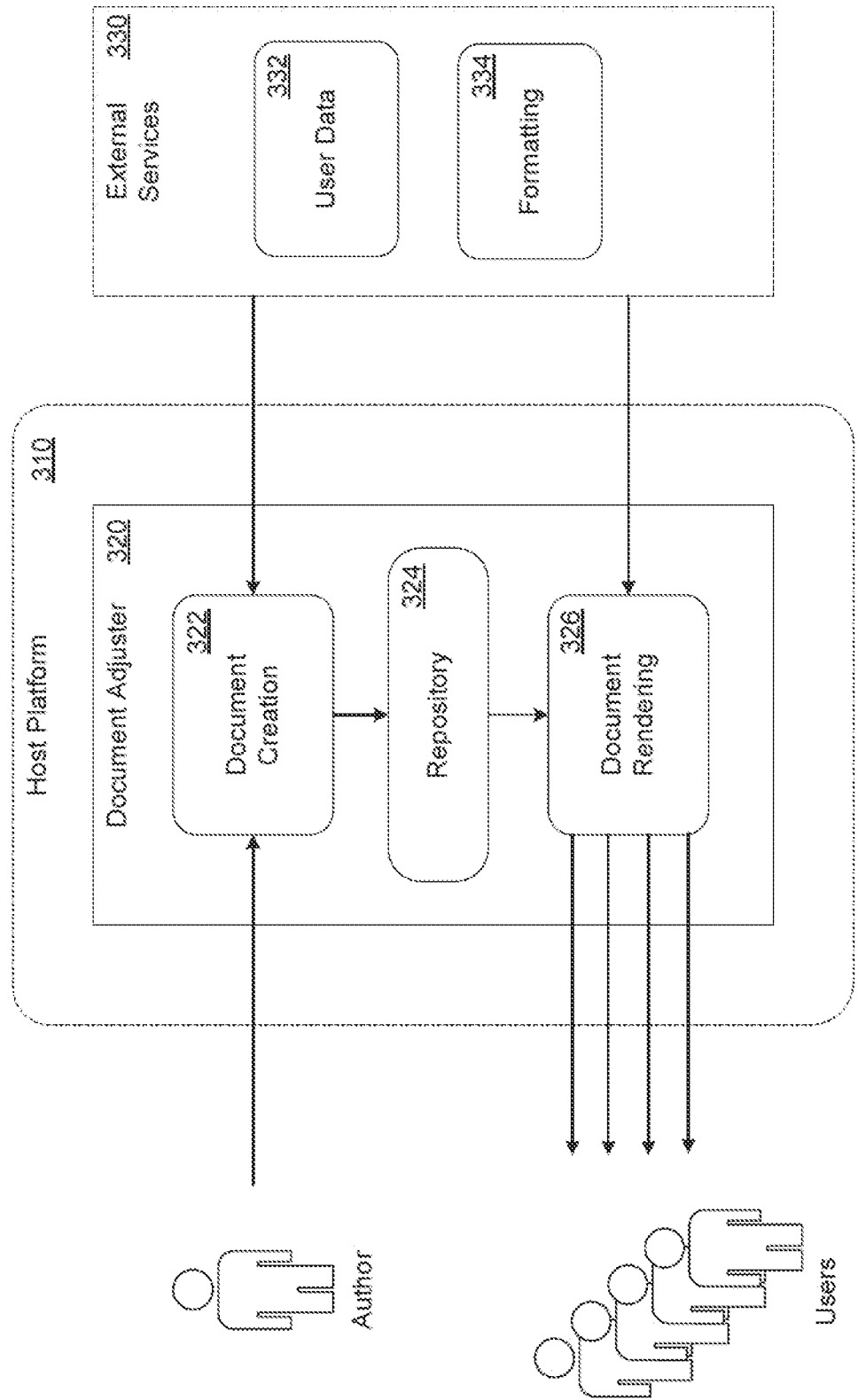
FIG. 3 is a diagram illustrating a descriptive document generation and interpretation process in accordance with example embodiments.

FIG. 3 illustrates a descriptive document generation and interpretation process 300 in accordance with example embodiments. Referring to FIG. 3, a host platform 310, such as a server, a cloud platform, a database, or the like, may host a document adjuster application 320 ("application 320"). The application 320 may enable both document creation via a document creation process 322 (or routine) and document rendering via a document rendering process 326 (or routine). The host platform 310 may also interact with external services 330 that are hosted externally/remotely from the host platform 310, however embodiments are not limited thereto. Instead, the external services 330 may be hosted internally by the host platform 310.

During the document creation process 322, a document author creates the document with the assistance of the application 320. Here, the application 320 may extract technical data from the document during the document creation process 322 and store the technical data within a technical data object in the repository 324. Both the document and the technical data object may be assigned a shared identifier such as a global universal identifier (GUID), or the like, which uniquely identifies the technical data object within the system. Furthermore, the same shared identifier may also be assigned to the document itself and stored in the repository 324 or some other storage area not shown.

When the application 320 receives requests for the descriptive document from different users (other than the document author), the application 320 may render a digital version of the document via the document rendering process 326. Here, the document rendering process 326 may extract technical data from the repository 324 that is associated with the document based on a GUID or other shared identifier that is assigned to the descriptive document. For example, the application 320 may receive a request from a user associated with a document having a GUID 1. In this case, the application 320 may use the GUID 1 from the document to identify the corresponding technical object stored in the repository 324 that shares the same GUID 1. Once a match is found, the application 320 may copy technical data (field names, values, etc.) of the user interface from the technical data object and add it to an instance of an electronic document (such as descriptive document 100 shown in FIG. 1, etc.) for the user.

Furthermore, the application 320 may simulate a user interface with the user interface displayed therein within a temporary storage area such as a clipboard of the UI framework based on user settings provided from the external services 330 such as a user data service 332 and a formatting service 334 which include user-specific preferences and settings for the user interface. Here, the application 320 may capture screen shot images of the simulated user interface which are to be used by a user during testing, and add the screen shot images to the instance of the electronic document. Furthermore, the electronic document including the text data from the technical data object and the screen shot images from the simulated user interface may be rendered within a window on a screen of the user's device.

According to various embodiments, the application 320 may decouple the test case description from user settings (language/date format/time zone), user specific configurations in the UI (which fields are displayed in which position). UI layouts (which layout is used such as classic web UI or other settings) and also UI changes caused by upgrades. Instead of using strongly time-dependent or user-configuration-dependent data, only technical data may be used as reference in a test case description. Instead of referring to language dependent field labels, technical field names may be used in the test case description. Instead of screenshots, only technical view data, screen data, and UI component names/labels (or the like) and their corresponding fields should be referenced. Nevertheless, the creation of a test case should still be convenient, without spending additional time to research technical attributes, etc. Therefore, the author of the test case should be assisted by the system, to create technical references.

Unfortunately, probably no human tester would be able to understand such technical document. This means, that the technical references have to be analyzed and translated to a human readable format. The output is a human readable test case description, which perfectly matches the current settings/configuration for the specific tester, for the exact product version of the software being tested by the tester. Thus, while the text-based content within the user interface will be the same regardless of the user, the style, layout, etc. of the user interface will differ per user based on user-specific UI settings. For example, features such as the overall UI layout, visibility of buttons, positions of buttons, menu features, number of displayed assignment blocks, number of displayed fields, etc., may be different for each user and might also change over time due to upgrades.

Traditionally, these differences might hinder/distract the tester. This has already been shown countless times in previous test cycles. Tests were set to "Error", and many incidents were created because the test case description did not match what was shown on the user interface during the testing process. Even if the root cause is the test case description, this is not always obvious. Especially, if the processor of the incident was not directly involved into the development, the processor has to spend some time for investigation. Processing this kind of incidents is a waste of time and budget. For example, the tester might get lost, if the tester is not that familiar with the process. As an example, the test case might require a check of the field "Determined at" in the "Eligibility Results" assignment block. Due to an upgrade, it may have been renamed to "Modified at" and no longer visible on the screen. If the field is not visible on the UI in the test environment, a warning can be issued to the test. The configuration of the UI in the test environment has to be adjusted. This can happen if a technical configure is changed due to an upgrade, or the like.

As another example, the test case might require a check of the "Actions" field. This field may be technically available, but not displayed as a result of user settings. For example, buttons might be shown or hidden depending on a user's authorizations. Also, a warning might be issued to the tester indicating that there is an insufficient authorization, for example, if a button is technically available but not shown or enabled. That is, a user specific configuration may prevent the field from being displayed even though it is there. It might be hidden by default or it might have been hidden by the tester prior to the test (for whatever reason). The test case might also require triggering an action from a menu on a left side. However, this menu may have been previously split and rearranged in a lower view. With this, different user interaction is required, to trigger the action under test. Especially for product standard tests (performed by a central department, e.g. for accessibility), very detailed test cases are created.

The testers cannot have deep knowledge about each feature of all different products. It might happen, that these test cases contain screenshots for every click, to be performed. This leads to issues when the navigation in the menu is different. For example, the tester might also be prompted to provide or to check date/time/timestamp fields. Specific values might be provided to/by the system. Here, the date formatting might differ ("DD.MM.YYY", "YYYY.MM.DD", "YYYY/MM/DD"). Also, the actual values are dependent on the calendar type (Gregorian date "21.12.2020"→Islamic Hijri date "1442/05/06") which may be different per user. In addition, user time-zones affect the time fields on the UI as well as language settings. Thus, various differences might occur. They might result from specific user settings or user configurations, but also from upgrades, etc.

From a technical perspective, also most of the underlying user interface is the same. For example, in a WebClient UI, the underlying Advanced Business Application Programming (ABAP) objects are identical. Nevertheless, the data is shown in different ways. This might lead to confusion, when comparing the actual UI with the information from the test case description (or any other descriptive document). This issue is neither limited to the UI technique nor to the type of descriptive document. Most UIs offer customizing/configuration possibilities. Not only test case descriptions have to be consistent with the actual software product. Any kind of software documentation should also be consistent.

To address these issues, the example embodiments are directed to an automated way of adjusting existing descriptive documents. The adjustment might consider any user specific settings/configurations but also UI changes caused, e.g. by upgrades. In principle, the adjustment is a user and release specific interpretation of a universal technical description. It is assumed, that the underlying technical description is stable and is valid across users and if possible, also across software versions/releases. If no automatic adjustment (interpretation) can be performed, corresponding messages will be raised. The author/owner of the document might be informed. The first hurdle is to create a pure technical descriptive document. Hence, references should only be made to stable technical attributes. Therefore, the author has to be assisted during the creation of the document.

Depending on the UI technique, the example embodiments introduce a new software program to create a technical reference for the current view within a descriptive document. In case of a browser-based UI, this tool might be a browser plugin. As another example, the program may be implemented as a cloud service, or the like. The program includes a technical reference extraction (TRE) component.

The technical reference is a unique criterion, to determine the corresponding object in the UI, for example, a view. In many cases, this kind of information can already be retrieved in the user interface by the UI framework. Sticking to the given example (CRM WebClient UI) the information such as the technical data stored in a technical data object 400 in FIG. 4A can be retrieved for the corresponding view.

Figure 4A:
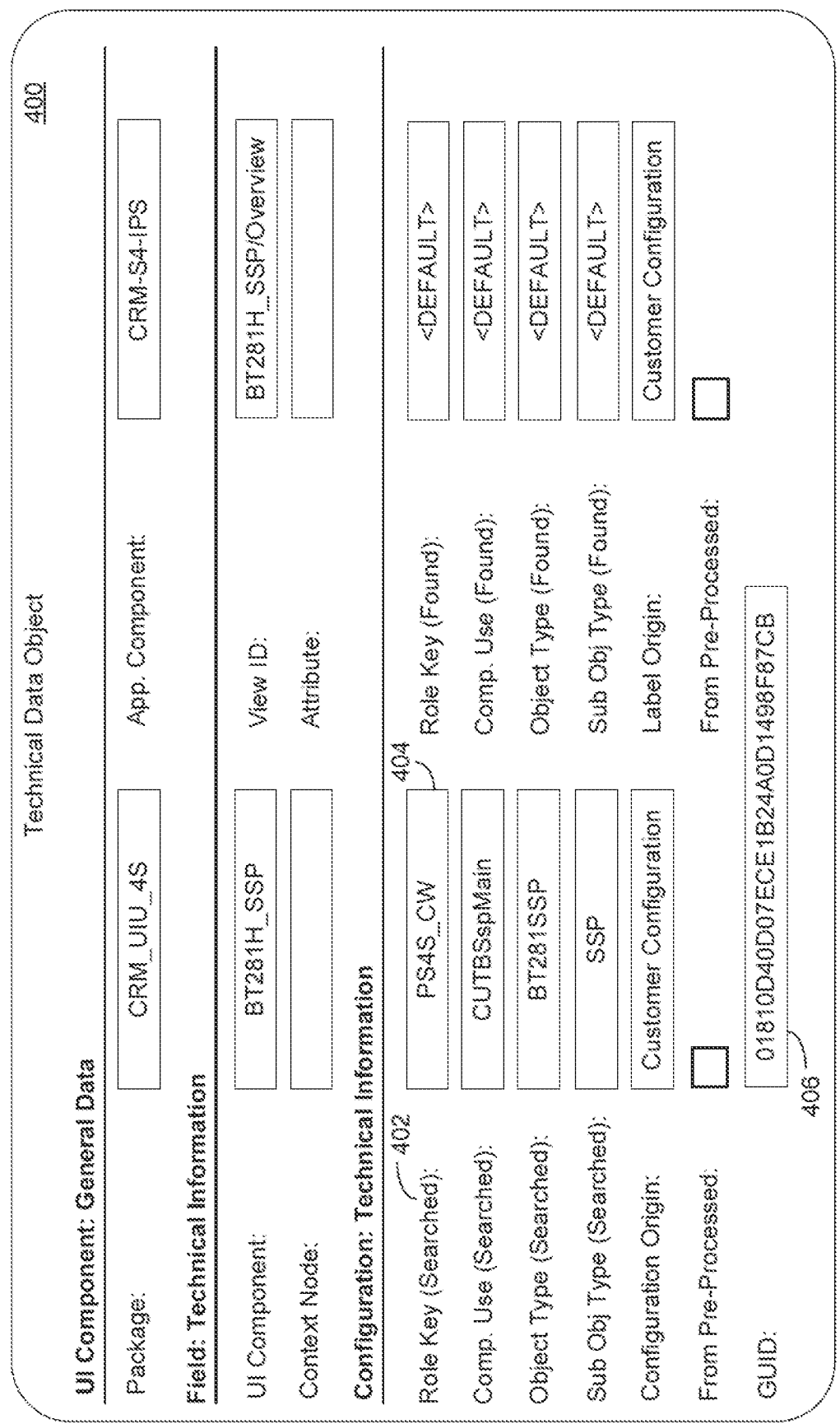
FIG. 4A is a diagram illustrating an example of a technical data object in accordance with example embodiments.

Referring to FIG. 4A, the technical data object 400 may include technical details of one or more UI elements such as buttons, labels, tabs, menus, menu items, and the like. The technical details may include an identifier ("package") which corresponds to a container for development objects such as classes, UI components, etc. Hence, the package attribute provides information on where the UI component can be found. The other technical data may include role keys, computer usage, object types, subobject types, configuration origin, and the like. Identifiers and values for each of these data attributes may be stored within predefined field of the technical data object 400. For example, a name 402 of a technical data attribute and a value 404 of the technical data attribute may be used as a technical reference for the UI elements. Each UI element may have multiple fields of names and values associated therewith. Also, the technical data object 400 may have different data sections such as general information which identifies the document data, technical field information which identifies the view and the UI component, technical configuration information, and the like. In addition, the technical data object 400 may be assigned a unique identifier 406 which could be a GUID, or the like. The unique identifier 406 may assigned to both the technical data object 400 and the descriptive document, thereby linking the two together. This enables the GUID to be used to search for either the technical data object 400 or the descriptive document.

The technical details may include configuration information such as unique identifiers of the UI elements along with text-based values (e.g., labels, etc.) associated with the LI elements. With this information, the corresponding view and its configuration can be determined. The TRE extracts this information and generates a technical reference. The information can be used directly as technical reference. In addition, the technical names of the (visible) fields and their values are collected. As an alternative, the information can be converted into an identifier, which is then used as technical reference. In this case, identifier is used as reference in the document. The relation between the identifier and the original technical attributes can be stored in the repository 324 show in FIG. 3.

The TRE is also able to create references for specific objects of the view. This can be achieved, just by adding the technical type and the technical name of the object and the technical information of the view. With this it is possible to reference not only views, but also specific fields, buttons, links, etc. If an author creates a descriptive document, the described UI is usually opened in parallel to create screenshots or copy field names, etc. or at least to verify the new document. With this, the content can directly be copied from the corresponding UI to the document. This is very convenient and in principle does not change by using the new approach with technical references. However, instead of using screen-capturing software or instead of copying manually selected text, the object in scope is selected and the TRE is triggered. This reference (including the collected field names/values, etc.) can be inserted to the clipboard of the UI framework. Afterwards, the information can be pasted in the document.

As an example, the TRE may offer buttons or other selectable actions in the web browser menu bar for creating technical references. The user might be able to assign a reference type via one of the buttons. The reference type defines if it should later be de-referenced as text ("TEXT"), screenshot ("SCREENSHOT"), or else. As an example, a technical reference to a field could mean a field-label or a picture of the field or something else. This may occur during the creation process of the document. Here, in a first step, the object to be referenced is selected on the UI in the test environment (e.g., by setting the focus accordingly using a mouse, etc. In a second step, one of the buttons of the TRE are triggered, to create a technical reference. There might be different buttons for the different reference types. e.g. one for TEXT and one for SCREENSHOT. The reference type is then evaluated during the rendering of the personalized descriptive document. If the reference type is SCREENSHOT, a screenshot is copied from the simulated UI to the descriptive document, replacing the technical reference. If the reference type is TEXT, no screenshot is copied, but only the field/button label, etc. As an alternative, drag and drop functionality might also be enabled, by adding additional plugins for the document editor, too. In this way, elements from the browser might be dragged from the browser and dropped to the editor. The technical reference might be inserted in the document automatically after dropping it.

Values that depend on user parameters are converted into a unified format. As an example, all dates might be converted to a Gregorian format, all times may be converted to UTC, and the like. In some embodiments, the document may be validated. For example, the application described herein may include a descriptive document validation (DDV) component that can be a standalone program or also an addon or plugin for the document editor. It might be triggered manually, at specific events (e.g. before/after save) or even on-the-fly during the editing process. The DDV may check if the document contains screenshots instead of technical references, etc. In case of a test case description, it is also possible to prove that every check-step contains technical references. As an example, the check-step for the tester might be: "Check that only one entry exists in the Eligibility Result table." This is human readable text, but the DVV would expect at least one technical reference (or its identifier), e.g.: "Check that only one entry exists for <TR_ELI-G_RES_TAB>". The identifier <TR_ELIG_RES_TAB> points to the technical reference of the corresponding UI object. The author may be notified if no technical reference is found.

Once the technical document has been created, it might be interpreted for a specific user. The technical reference interpretation (TRI) component analyses the references to technical objects and also the content of the corresponding fields, etc. In addition, the TRI may request a user specific information (USI) service (e.g., the service 332, etc.) to derive all relevant user settings/configurations.

Furthermore, the TRI may request a technical object information (TOI) component, to provide field lists for a referenced view in the corresponding version/release. With this, the application can validate if all fields from the reference in the document are available. In case a field is missing, an error message may be inserted in the beginning of the interpreted document. Accordingly, a user can be notified if there is an inconsistency in the document. Also, the author of the document could be informed that the underlying technical document is inconsistent, e.g. for a specific software release. In case a field is technically available but not visible, a waning could be inserted in the corresponding position of the document. Herewith, the user can be notified to adjust his configuration accordingly and how to do this.

Figure 4B:
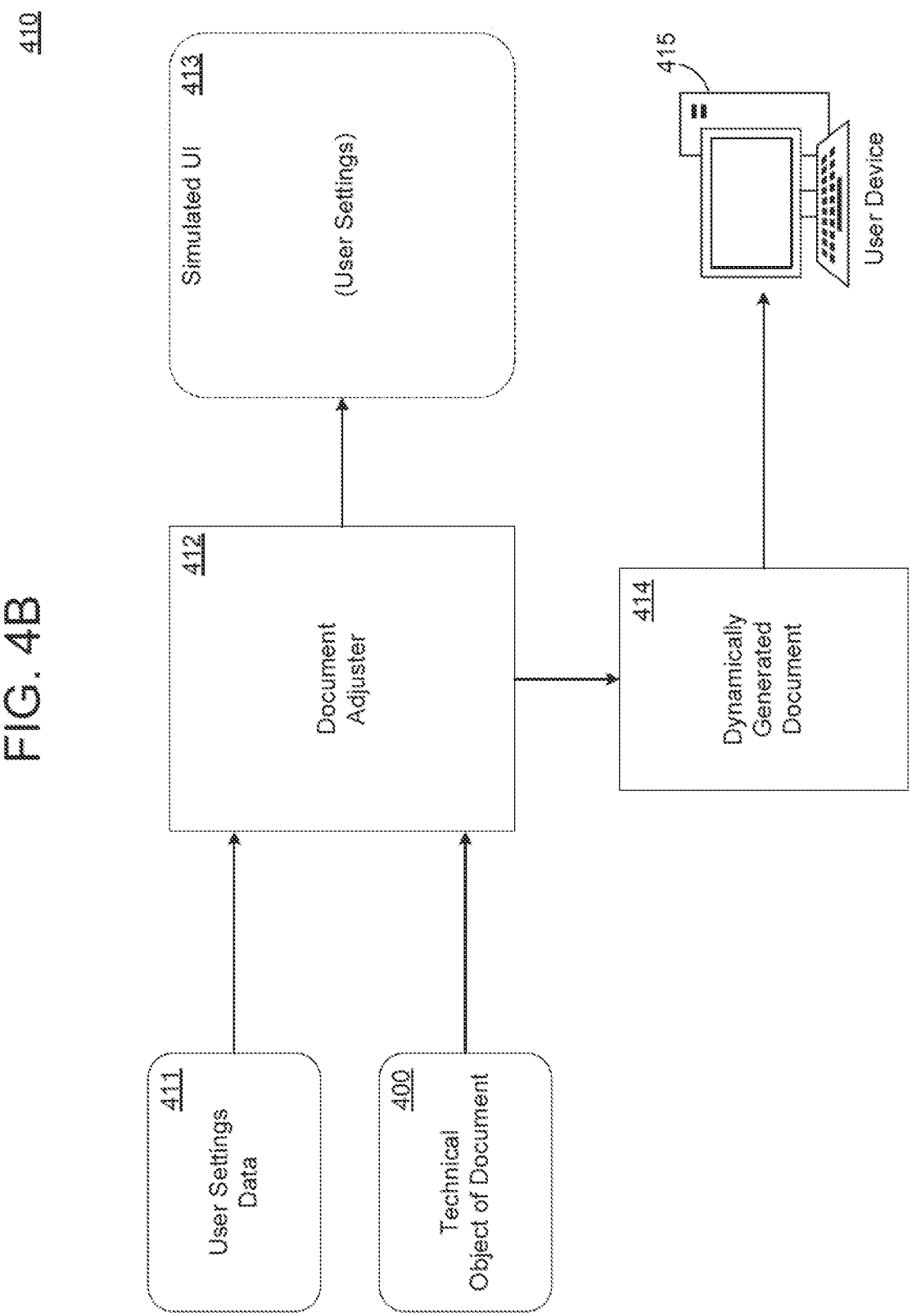
FIG. 4B is a diagram illustrating a process of dynamically generating a descriptive document for a user in accordance with example embodiments.

With the combined information about the referenced object, the original data from the fields, the user specific data and the release specific information, the application described herein may simulate the UI for the corresponding user and the corresponding version/release of the document as shown in FIG. 4B. The simulation might be performed by requesting the UI in the corresponding software system, with all the user settings, etc. In other words, the application may send a request to the software system, as the creator of the technical reference has done, for accessing the UI (except of user and release specific information, which might differ). Finally, the technical information can be substituted with the actual information from the simulated UI. Here, the application may query a UI framework for the release information and the user information.

A formatting service may be used to convert field values from the unified format to the user specific format, depending on the settings. UI changes like renaming fields, buttons, views, etc. or moving UI elements to other positions or the like can be included automatically in the interpretation. The application described herein increases the consistency between descriptive documents and the software product described within. This is of special interest regarding test case descriptions but could also be applied to other sources, for example, application help, online help, increasing the quality of the documentation, and the like. Because the user specific interpretation from a technical document to a human readable document is automated, no manual interaction is required, to update the descriptive documents due to minor UI changes. As a result, the number of incidents caused by inadequate descriptions can be reduced drastically. The increased quality of documentation leads to a reduced setup phase of custom systems. The result is a reduction of the total cost of ownership for both the software developing company and its customers.

FIG. 4B illustrates a process 410 of dynamically generating a dynamically generate document 414 (descriptive document) for display within a window on a user device 415 in accordance with example embodiments. Referring to FIG. 4B, a document adjuster application 412 ("application 412") may receive a request for an electronic document from the user device 415. For example, the request may include an identifier of the document, such as GUID, or the like. The application 412 may look-up a technical data object within a repository (not shown) which has the same identifier as the requested document, and retrieve technical details of the document from the technical object. The application 412 may also retrieve user-specific formatting settings 411 from an external service(s) and generate a simulated user interface 413 which includes a user interface of the application to be tested in which the user-specific formatting settings 411 have been applied to the formatting of the user interface such as color, language, style, positioning, hidden/visible features, etc.

The application 412 may generate screen shots from the simulated user interface 413 of user interface controls, buttons, menus, actions, etc., and add these screen shots to a dynamically generated document 414. In addition, the application 412 may add the data attributes from the technical data object 400 to the dynamically generated document 414. In some cases, these elements may be formatted based on the user settings as well. The dynamically generated document 414 can then be output to a screen of the user device 415, such as shown in the screen 200 of the example of FIG. 2.

FIG. 5 illustrates a method 500 of rendering a descriptive document in accordance with an example embodiment. For example, the method 500 may be performed by a database node, a cloud platform, a server, a computing system (user device), a combination of devices/nodes, or the like. Referring to FIG. 5, in 510, the method may include retrieving user interface configuration settings from a user database. For example, the user interface configuration settings may include language settings (i.e., which language to display the UI elements), color, shading, which buttons to display/hide, which tabs to display/hide, positioning information of the UI elements, text styling and format, and the like. In addition, information about a version and/or release of the settings may also be consumed.

In 520, the method may include generating, via a temporary storage area, a simulated user interface that includes a plurality of user interface elements and formatting the user interface elements within the simulated user interface based on the user interface configuration settings. For example, the method may include generating a display of the descriptive document based on the technical data from a technical data object and the user interface configuration settings of the user that are retrieved in 510.

In 530, the method may include composing a window that is independent of the simulated user interface with text from a document and screenshot images of one or more formatted user interface elements from the simulated user interface corresponding to the text embedded therein. In 540, the method may include rendering the window via a display of a computing device. For example, the rendering may include displaying the window next to another window that includes a software test environment associated with the document.

In some embodiments, the method may further include extracting data values from the document during a document creation process, assigning identifiers to the technical data values, respectively, and storing fields of the technical data values paired with the assigned identifiers within a technical data object. In some embodiments, the method may further include assigning a shared identifier to both the document and the technical data object within a data store, and querying the technical data object for the text based on the shared identifier.

In some embodiments, the formatting may include applying one or more of coloring, style, positioning, and language translation to one or more user interface elements within the simulated user interface based on the user interface configuration settings. In some embodiments, the composing may include initially composing the window with technical references in place of the text and the screenshot images, and replacing the technical references with the text and screenshot images which show the user-specific formatting.

In some embodiments, the generating may further include generating the simulated user interface within a clipboard of a user interface framework, and the composing comprises copying the screenshot images from the clipboard and passing them back to the window. In some embodiments, the method may further include determining whether the simulated user interface is valid based on a comparison of technical data values stored in the document and technical data values stored in a technical data object, and rendering the simulated user interface only in response to determining the simulated user interface is valid.

Figure 6:
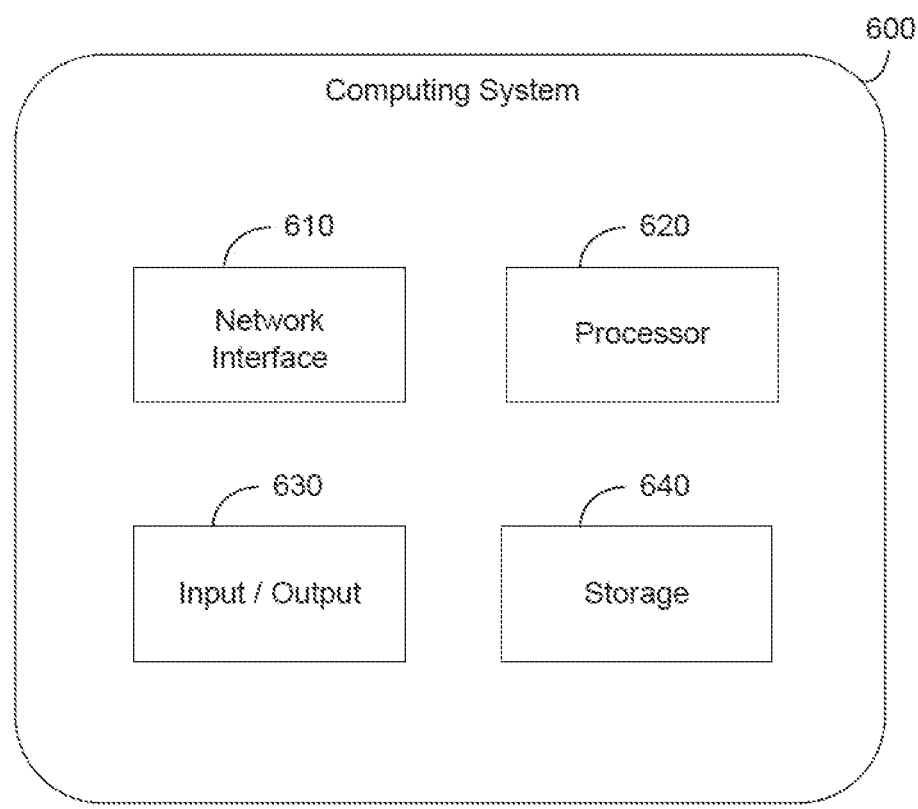
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, records, partitions and sub-partitions. The storage 640 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
    retrieving identifiers of user interface elements for a user interface of a software application and textual labels of the user interface elements from a data object in a user database;
    retrieving user interface settings of a user from an external system, wherein the user interface settings include user specific configurations for a positional display of fields in the user interface;
    generating a simulated view of the user interface for the user including a plurality of user interface elements generated based on the identifiers of the user interface elements and the textual labels of the user interface elements retrieved from the user database which are formatted based on the retrieved user interface settings, wherein the simulated view of the user interface is generated within a clipboard of a user interface framework and the formatting occurs within the clipboard;
    capturing a screen shot image of the simulated view of the user interface generated within the clipboard of the user interface framework;
    composing a digital document for the user, the digital document including: 1. the captured screen shot image of the simulated view of the user interface rendered therein, and 2. text describing the captured screen shot image of the simulated view of the user interface;
    displaying the digital document via a display window; and
    extracting data values from the digital document during a document creation process in which the document is created, assigning identifiers to technical data values in an underlying database, respectively, and storing fields of the data values paired with the assigned identifiers within the data object.

2. The method of claim 1, wherein the displaying comprises displaying the window next to another window that includes a software test environment associated with the software application.

3. The method of claim 1, wherein the method further comprises assigning a shared identifier to both the digital document and the data object, and querying the data object for the data values based on the shared identifier.

4. The method of claim 1, wherein the formatting comprises applying one or more of coloring, style, positioning, and language translation to one or more user interface elements within the simulated view of the user interface based on the retrieved user interface settings of the user.

5. The method of claim 1, wherein the composing comprises initially composing the display window with technical references in place of the screen shot image, and replacing the technical references with the captured screen shot image when generating the digital document.

6. The method of claim 1, wherein the method further comprises determining whether the simulated view of the user interface is valid based on a comparison of technical data values stored in the digital document and technical data values stored in the data object, and rendering the generated digital document in response to determining the simulated view of the user interface is valid.

7. A computing system comprising:
    a memory; and
    a processor configured to
        retrieve identifiers of user interface elements for a user interface of a software application and textual labels of the user interface elements from a data object in a user database,
        retrieve user interface settings of a user from an external system, wherein the user interface settings include user specific configurations for a positional display of fields in the user interface;
        generate a simulated view of the user interface for the user including a plurality of user interface elements generated based on the identifiers of the user interface elements and the textual labels of the user interface elements retrieved from the user database which are formatted based on the retrieved user interface settings, wherein the simulated view of the user interface is generated within a clipboard of a user interface framework and the formatting occurs within the clipboard;
        capture a screen shot image of the simulated view of the user interface generated within the clipboard of the user interface framework;
        compose a digital document for the user, the digital document including: 1. the captured screen shot image of the simulated view of the user interface rendered therein, and 2. text describing the captured screen shot image of the simulated view of the user interface,
        display the digital document via a display window; and
        extract data values from the digital document during a document creation process in which the document is created, assign identifiers to technical data values in an underlying database, respectively, and store fields of the data values paired with the assigned identifiers within the data object.

8. The computing system of claim 7, wherein the processor is configured to display the display window next to another window that includes a software test environment associated with the software application.

9. The computing system of claim 7, wherein the processor is further configured to assign a shared identifier to both the digital document and the data object, and query the data object for the data values based on the shared identifier.

10. The computing system of claim 7, wherein the processor is configured to apply one or more of coloring, style, positioning, and language translation to one or more user interface elements within the simulated view of the user interface based on the retrieved user interface settings of the user.

11. The computing system of claim 7, wherein the processor is configured to initially compose the display window with technical references in place of the screen shot image, and replace the technical references with the captured screen shot image when generating the digital document.

12. The computing system of claim 7, wherein the processor is configured to generate the simulated view of the user interface within a clipboard of a user interface framework, and capture the screen shot image of the simulated view of the user interface from the clipboard.

13. The computing system of claim 7, wherein the processor is further configured to determine whether the simulated view of the user interface is valid based on a comparison of technical data values stored in the digital document and technical data values stored in the data object, and render the generated digital document in response to determining the simulated view of the user interface is valid.

14. The computing system of claim 7, wherein the processor is further configured to extract technical and static data values from the digital document during the document creation process, and store the extracted technical and static data values, including field names, field types, and user interface elements, within the data object.

15. The computing system of claim 7, wherein the digital document is a digital instance of a physical descriptive document including a plurality of sections with instructions and descriptions of inputs that are to be made by a user within a user interface.

16. A non-transitory computer-readable medium comprising instructions which when executed by a processor cause a computer to perform a method comprising:
retrieving identifiers of user interface elements for a user interface of a software application and textual labels of the user interface elements from a data object in a user database;
retrieving user interface settings of a user from an external system, wherein the user interface settings include user specific configurations for a positional display of fields in the user interface;
generating a simulated view of the user interface for the user that includes a plurality of user interface elements generated based on the identifiers of the user interface elements and the textual labels of the user interface elements retrieved from the user database which are formatted based on the retrieved user interface settings, wherein the simulated view of the user interface is generated within a clipboard of a user interface framework and the formatting occurs within the clipboard;
capturing a screen shot image of the simulated view of the user interface generated within the clipboard of the user interface framework;
composing a digital document for the user, the digital document including: 1. the captured screen shot image of the simulated view of the user interface rendered therein, and 2. text describing the captured screen shot image of the simulated view of the user interface;
displaying the digital document via a display window; and
extracting data values from the digital document during a document creation process in which the document is created, assigning identifiers to technical data values in an underlying database, respectively, and storing fields of the data values paired with the assigned identifiers within the data object.

17. The non-transitory computer-readable medium of claim 16, wherein the displaying comprises displaying the window next to another window that includes a software test environment associated with the software application.

18. The non-transitory computer-readable medium of claim 16, wherein the method further comprises extracting data values from the digital document during a document creation process, assigning identifiers to technical data values in an underlying database, respectively, and storing fields of the data values paired with the assigned identifiers within the data object.

* * * * *